Jan. 28, 1969

J. P. LE BEL 3,424,400

SONIC BOOM AND SHOCK WAVE ELIMINATOR

Filed June 25, 1965

INVENTOR.
John P. Le Bel

United States Patent Office 3,424,400
Patented Jan. 28, 1969

3,424,400
SONIC BOOM AND SHOCK WAVE ELIMINATOR
John P. Le Bel, 238½ S. Vendome St.,
Los Angeles, Calif. 90057
Filed June 25, 1965, Ser. No. 466,879
U.S. Cl. 244—1          6 Claims
Int. Cl. B64c 21/02, 3/28

ABSTRACT OF THE DISCLOSURE

A means to eliminate or buffer the shock waves and sonic booms generated by supersonic aircraft with elongate, forwardly tapered atmosphere piercing noses comprising a rotary front section in said nose and a split sphere with counter rotary hemispherical sections at the terminal end of the nose.

---

The present invention relates generally to aircraft and vehicles flying through the atmosphere, either manned or unmanned.

The main object of my invention is to eliminate or advantageously modify the sonic boom and shock waves ordinarily generated by vehicles traveling through the atmospheres at supersonic speeds.

Still another object of the invention is to provide means for the main purpose set forth above, which means also serves as a gyro to stabilize its related vehicle, preventing pitch and yaw as well as other abnormal attitudes that are unsafe to the operation of the vehicle.

Another object of the invention is to provide a means of the character referred to which is such that it acts upon the air at the forward terminal end of the vehicle so as to prevent the air from establishing a normal flow pattern longitudinally rearwardly about the skin of the craft whereby frictional resistance and heat generated thereby is reduced to such an extent that the use of special materials and the like, presently required in supersonic craft to withstand the frictional resistance and heat encountered, can be dispensed with.

Present supersonic or hypersonic aircraft have needle-like noses to pierce their way through the atmospheric environment. The expenditure of great power is required to ram or shoot such craft into supersonic and hypersonic flight. The entry into and the sustaining of such flight causes tremendous frictional aerodynamic heating and great structural stress and strain which greatly shortens the life of the craft by weakening its structure. The entry into and sustaining of supersonic flight causes shock waves and the sonic booms which become more severe as speeds are increased.

An object of my invention is to provide means at the leading end of the needle-like nose of a craft of the character referred to which serves to freely penetrate the sonic barrier and to scramble and disperse the adjacent air to materially and beneficially alter shock wave characteristics by permitting freer passage of the craft through the air.

These and other objects and features of my invention will be apparent from the following description when taken in conjunction with the annexed drawings wherein.

Figure 1:
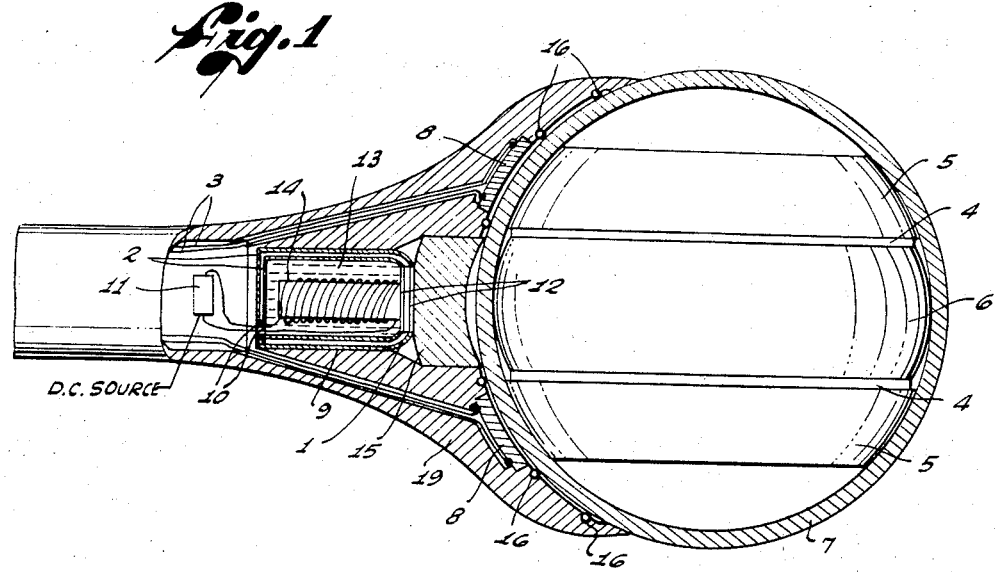
FIG. 1 is a sectional view of the terminal end of an aircraft nose with my invention related thereto.

Referring to FIG. 1 of the drawings, I have shown one form of my invention related to the nose portion of a supersonic aircraft, which nose portion is shown as a forwardly tapered and pointed extension of the fuselage or airframe.

The structure provided by the invention includes, generally, a forwardly opening concaved cavity in the forward end 19 of the airframe nose, a sphere or ball 7 rotatably seated in the cavity with its forward portion projecting forwardly therefrom. The diameter of the sphere is at least equal to and is, preferably, slightly greater than the diameter of the rim of the cavity in the forward terminal end portion of the nose, which portion of the nose can, as illustrated, be in the nature of a belled or radially outwardly and forwardly flared portion of the nose, to facilitate establishment of the cavity.

The invention further includes bearing means for rotatably supporting the sphere in the cavity, retaining means for retaining the sphere in the cavity and motor means for rotating the sphere in the cavity.

The bearing means is shown as including ball bearings 16 rotatably carried in the concaved surface of the cavity and projecting forwardly from said surface a limited predetermined distance to rotatably engage the exterior surface of the sphere.

The sphere is a light, temperature resistant, hollow, shell-like structure of a suitable non-magnetic metal.

The means for retaining the sphere in the cavity includes an annular band 6 of ferrous material about the sphere, preferably on the inside surface thereof, and a magnet located centrally in the nose at the bottom of the cavity and magnetically attracting the band and holding the sphere axially rearwardly and in position in the cavity.

The magnet is a cryogenic electromagnet having a pair of spaced pole pieces 15 at the surface of the cavity, a horseshoe core 14 arranged rearward of the pole pieces and with its terminal ends connecting with said pole pieces, an extremely fine or small (No. 5) wire 9 coiled about the core, a heat insulated flask or jar 2, such as a vacuum flask about and housing, the core and wire coil and filled with a body of liquid nitrogen 13, the temperature of which is about 250 degrees below zero, and an electric power cell 11 outside of the jar and connected with lead ends of the wire, which lead ends extend through suitable seals 10 in the jar.

It will be apparent that the cryogenic electromagnetic retaining means provided is such that great or considerable holding force is generated and yet the means is extremely small, light, compact and entirely self-contained, requiring no lead lines or the like extending longitudinally of the craft's nose to large, heavy batteries or other suitable power sources. The retaining means is such that it can be wholly contained in the terminal end portion of the craft's nose.

The means provided to rotate the sphere in and relative to the cavity is an electromagnetic drive and includes a pair of axially spaced, concentric electric squirrel cage type rotor bands 5 about the sphere, preferably on the inner surface thereof and arranged to occur in axial alignment with and at opposite sides of the band 6 and pairs of spaced electromagnetic defection pole pieces 8 in the nose of the craft to occur at the surface of the cavity at opposite sides of the electromagnetic retaining means and each in a cooperating radial plane with a band 5. The bands 5 and 6 are in electrical insulated spaced relationship from each other, as indicated at 4.

The pole pieces 8 are connected with suitable electric power lines B extending longitudinally rearwardly through the craft's nose to a suitable power source in the craft.

The particular drive means that I provide is more fully disclosed in my Patent No. 3,128,964, issued Apr. 14, 1964. Further and more detailed explanation of the drive means can be found in "Electric Machinery" by A. E.

Fitzgerald and Charles Kingsley, McGraw-Hill Company, Inc., 1952, pages 445–448.

With the structure set forth above, it will be apparent that the retaining means maintains the rotor bands in proper alignment with the pole pieces and that the pair of rotor bands, with their related pole pieces establish a balanced drive which does not tend to urge the holding band 6 out of alignment with its holding magnet.

It will be further apparent that the sphere, with the means here provided, can be rotated at an extremely high rate of speed and is not subject to being displaced.

In operation, as the craft travels through the air at supersonic speeds, and the leading nose portion thereof pierces the sonic barrier, the foremost or leading surfaces of the rotating sphere, in effect, mill or grind into and through the air compacted by the advancing craft to disperse and open the compacted air, which air is similar to a solid wall and is referred to as the sonic barrier, and so as to allow for freer passage of the craft through the air. The sphere, as it mills and grinds its way through the air, displaces and disperses the air it contacts in such a manner that the air is, in effect, mixed or homogenized so that a normal flow stream of air about the advancing fuselage of the craft, which normally creates great frictional resistance and heat, is prevented from being established by a boundary layer of homogenized air generated by the ball.

The above greatly reduces the power required to move the craft through the air, making it possible to attain greater speeds with less power.

Further, the above acts to buffer, and so alters the generation of shock waves and resulting sonic booms, by the fuselage of the craft, that such effects cease to be a problem.

It is to be noted that the above only affects the fuselage of the craft and that the wings and control surfaces of the craft are not affected so as to adversely affect operation and control of the craft.

The entry and/or passage of the wings, etc., through the air will create their respective shock waves and sonic booms, but such are not so great and detrimental as those normally created by the fuselage of supersonic aircraft.

Further, the wings, tail elevators and the like, being uneffected aerodynamically, are available to effect trim and control of the craft.

Figure 2:
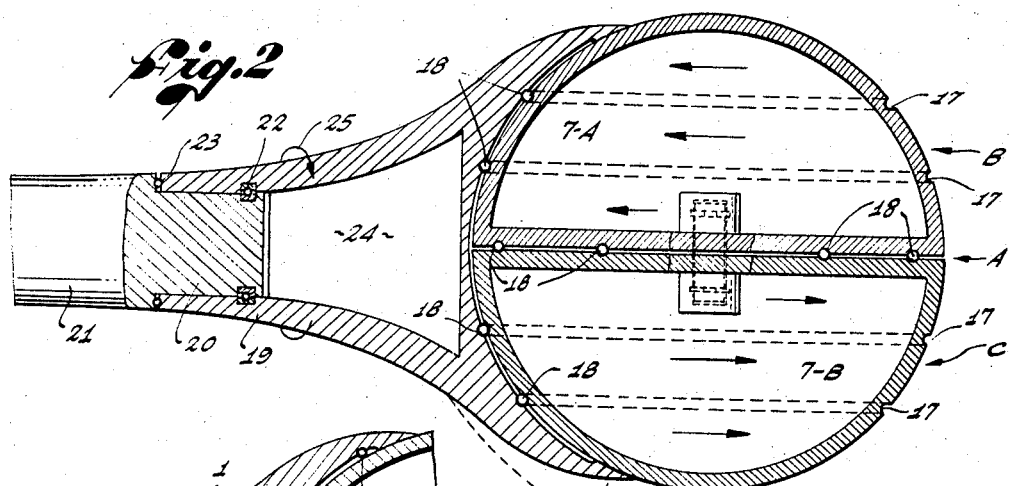
FIG. 2 is a view similar to FIG. 1 showing another form of my invention.
Figure 3:
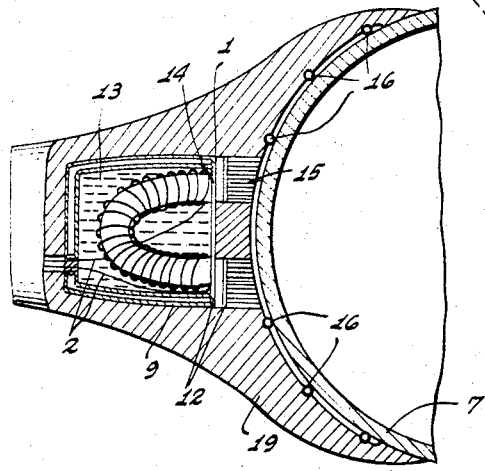
FIG. 3 is a sectional view of the structure shown in FIG. 1, and taken at right angle thereto.

Referring to the preferred form of my invention, shown in FIG. 2 of the drawings, the sphere is split so as to define two halves or hemispheres, 7–A and 7–B, rotatably connected together by a suitable shaft and bearing means, shown in dotted lines in encircled area 3 of FIG. 2, for free relative and counter rotation without axis separation and displacement.

In this form of the invention, bearing means 18, cryogenic magnetic retaining means and electro-magnetic drive means, similar to the bearing means retaining means and drive means in the first form of the invention, are provided for each hemisphere, with drive means for one hemisphere rotating said hemisphere in the opposite direction from that direction in which the other hemisphere is driven by its related drive means.

I have elected not to show the retaining means and drive means in FIG. 2 of the drawings, as such would only tend to complicate and confuse the illustration.

In practice, the surface coating of the sphere or hemispheres can be rough to enhance the sought after grinding or milling action. In such a case, the exterior of the sphere or hemispheres can be provided with smooth races 17 for the bearings 18, as clearly illustrated in FIG. 2.

In addition to the foregoing, the forward portion 19 of the nose is separate from the remaining portion 21 of the nose and is provided with a rearwardly opening socket 24 in the bottom of which the cryogenic retaining means is arranged and into the rear end of which a spindle 20 on the nose portion 21 is rotatably engaged. The portion or section 19 is rotatably retained on the spindle 20 by bearing means 22 and 23. The nose portion or section 19 can be provided with suitable drive means for rotating the section 19 relative to the section 21, indicated by the arrows 25. The drive means can include vanes 18A (shown in dotted lines) on the section 19 to be engaged by the air moving rearwardly by the nose to effect axial rotation of the section 19 relative to the fixed section 21 of the nose or, if desired, suitable electric drive means (not shown) can be provided to rotate the section 19 relative to the stationary section 21 of the nose.

This second form of the invention has marked advantages over the first form of the invention, since the gyroscopic effect generated by rotation of one hemisphere is countered and cancelled by the similar, but opposite, effect generated by the other rotating hemisphere. Cancelling and balancing of the gyroscopic effects of the hemisphere eliminates much of the gyroscopic effects that might otherwise materially adversely affect the trim and control of the aircraft and which might be encountered in practicing the first form of the invention.

It is recognized that certain gyroscopic effects will be encountered in the operation of my invention, but such effects can be controlled by the mass and speed of the relatively rotatable parts and by the trim and control surfaces of the craft with which my invention is related.

In addition to the foregoing, counter rotation of the hemispheres results in moving and displacing the air acted upon by each hemisphere in the opposite direction from the direction in which the air is displaced or moved by the other hemisphere. Accordingly, the mixed and/or homogenized air is not directed primarily to one side of my new means, as in the first form of the invention, and is better distributed for passage about the exterior of the advancing fuselage of the related craft.

Turning of the section 19 in the manner set forth above also further distributes the air being moved radially from two opposite sides of the central longitudinal axis of the construction by the oppositely rotating hemispheres circumferentially about the said axis of the construction and so that the fuselage is substantially completely enveloped by the boundary layer of mixed or homogenized air generated by the hemispheres, as the craft advances through the air.

1. A means to buffer or modify the sonic boom and shock waves created by supersonic and hypersonic aircraft, comprising an elongate airframe with a sectional forwardly projecting pointed nose of non-magnetic material and comprising a rear section fixed to the craft and a forward section rotatable relative to the rear section, a forwardly opening, semi-spherical cavity in the forward end of the forward section and a sphere of non-magnetic material seated in the cavity, magnetic retaining means in and between the sphere and nose, holding the sphere in the cavity and electro-magnetic drive means within and between the sphere and nose rotating said sphere at a high speed on an axis normal to the axis of the nose.

2. A means as set forth in claim 1, including anti-friction bearings within said cavity and engaging the aft surface of said sphere.

3. A means as set forth in claim 1, wherein said retaining means includes a unitary cryogenic holding magnet in the nose with pole pieces adjacent the center of the cavity and a ferrous metal holding band about said sphere, within the flux field of the magnet.

4. A means as set forth in claim 1, wherein said sphere is sectional and comprises a pair of relatively rotatably hemispheres, there being separate electro-magnetic drive means within and between each hemisphere and the nose and driving said hemispheres in opposite directions.

5. A means as set forth in claim 1, wherein the nose is sectional having a fixed rear section and a front section rotatably carried by the rear section, said front section having curved aerodynamic fins whereby the ram air by said aircraft in flight rotates said front section and about the axis of the nose.

6. A means as set forth in claim 1, wherein said sphere is sectional and comprises two relatively rotatable hemispheres of non-magnetic materials arranged with their flat sides in opposed relationship and on a plane parallel with the axis of the nose, means rotatably connecting the hemispheres together on an axis normal to the axis of the nose, bearing means including bearings carried by the nose at the surface of said cavity and engaging the exterior of said hemispheres, said retaining means including a unitary cryogenic electromagnet in the nose with pole pieces at the surface of the cavity and ferrous bands about the hemispheres and within the flux of the magnet, the sectional sphere being greater in diameter than the forward portion of the nose and the cavity, said nose being sectional and comprising a forward section carried by a stationary rear section for free rotation about the longitudinal axis of the nose, drive means rotating the forward section relative to the rear section, said electromagnetic drive means rotating said hemispheres in opposite directions and including annular series bars about the hemispheres and pairs of electro-magnetic pole pieces in the nose at the surface of the cavity and each in a common plane with a related series of rotor bars.

References Cited

UNITED STATES PATENTS

| | | | |
|---|---|---|---|
| 1,785,300 | 12/1930 | Castelcicala | 244—41 |
| 1,832,396 | 11/1931 | Howard | 244—41 |
| 1,840,594 | 1/1932 | Minor | 244—41 |
| 3,128,964 | 4/1964 | Le Bel | 244—1 |
| 3,132,825 | 5/1964 | Postle et al. | 244—1 |

FOREIGN PATENTS

| | | |
|---|---|---|
| 614,091 | 12/1926 | France. |
| 1,104,006 | 11/1955 | France. |

FERGUS S. MIDDLETON, *Primary Examiner.*

U.S. Cl. X.R.

244—041